United States Patent [19]

Ham et al.

[11] Patent Number: 4,837,823
[45] Date of Patent: Jun. 6, 1989

[54] COMMUNICATION SYSTEM

[75] Inventors: Wilhelmus J. Ham; Jacob T. Nagelhout, both of Huizen, Netherlands

[73] Assignee: Hollandse Signaalapparaten B.V., Hengelo, Netherlands

[21] Appl. No.: 21,872

[22] Filed: Mar. 4, 1987

[30] Foreign Application Priority Data

Mar. 6, 1986 [NL] Netherlands .................. 8600576

[51] Int. Cl.$^4$ .................................................. H01I 7/00
[52] U.S. Cl. ............................................ 380/34; 380/6; 380/48; 375/1
[58] Field of Search ................ 380/6, 8, 34, 48; 375/1

[56] References Cited

U.S. PATENT DOCUMENTS

| 4,066,964 | 1/1978 | Costanza et al. | 380/34 |
|---|---|---|---|
| 4,188,580 | 2/1980 | Nicolai et al. | 380/6 |
| 4,388,723 | 6/1983 | Keen | 375/1 |
| 4,418,393 | 11/1983 | Zacheile, Jr. | 375/1 |
| 4,442,527 | 4/1984 | Munday | 375/1 |
| 4,476,566 | 10/1984 | Dent | 375/1 |
| 4,477,912 | 10/1984 | Russell | 375/1 |
| 4,532,635 | 7/1985 | Mangulis | 375/1 |
| 4,554,668 | 11/1985 | Deman et al. | 375/1 |
| 4,578,816 | 3/1986 | Rabain et al. | 380/34 |
| 4,583,231 | 4/1986 | Puckette | 375/1 |
| 4,669,089 | 5/1987 | Gahagan et al. | 375/1 |
| 4,694,467 | 9/1987 | Mui | 375/1 |
| 4,707,839 | 11/1987 | Andren | 375/1 |

Primary Examiner—Salvatore Cangialosi
Attorney, Agent, or Firm—Emmanuel J. Lobato

[57] ABSTRACT

A frequency hopping communication system whose transmitters and receivers after synchronization hop over a frequency series of a first type. To synchronize the transmitters and receivers, sync data from a transmitter are transmitted and received in portions spread over a frequency series of a second type in order to protect the transmission of sync data against jamming and eavesdropping.

17 Claims, 9 Drawing Sheets

COMMUNICATION SYSTEM

The invention relates to a frequency-hopping communication system, comprising at least one transmitter provided with a of clock-pulse generator, a transmitter counting circuit connected to the clock-pulse generator for producing timing signals, a transmitter synthesising circuit driven by said timing signals for time-dependently selecting a carrier frequency from a predetermined periodic frequency series of the first type and for generating and modulating said carrier frequency; the communication system further comprising at least one receiver provided with a clock-pulse generator, a receiver counting circuit connected to said clock-pulse generator for generating timing signals, a receiver synthesising circuit driven by said timing signals for time-dependently selecting the carrier frequency from the predetermined periodic frequency series of the first type also available in the receiver and for demodulating said carrier frequency; the communication system still further comprising synchronisation means for synchronising the receiver synthesising circuit with the transmitter synthesising circuit by means of a message of the transmitter containing the count information of the transmitter counting circuit at the time of commencement.

Such a communication system is known from GB-A-No. 2100944, which specification concerns the synchronisation of a receiver with a transmitter, i.e. the synchronisation of the receiver counting circuit with the transmitter counting circuit, to transmit all needed count information from the transmitter counting circuit to the receiver counting circuit. This however occurs at one fixed frequency selected from a set of fixed frequencies. The frequency used is randomly selected from the fixed set of frequencies. Therefore, a receiver continuously "listens" to the set of (four in the given example) fixed frequencies to establish when a transmitter commences a message to subsequently bring the receiver counting circuit in synchronism therewith. This method has the disadvantage that the possibility of communication may be prevented. For example, a jammer is capable of continuously jamming the set of fixed frequencies, rendering the synchronisation of transmitter and receiver and, hence, further communication impossible. It is also easy to listen in to count information to be transmitted and to use this for one's own receiver counting circuit, allowing listening in also during further communication. Furthermore, there is the possibility that false information be transmitted, resulting in complete derangement of the receiver counting circuit.

It is an object of the present invention to overcome the above problems. To this effect the synchronisation means is arranged to successively transmit count information spread over different frequencies, where each frequency, being retained for a certain time interval, is an element of a predetermined frequency series of the second type, which frequency series is an element of a predetermined set of frequency series, where the selection of the frequency series of the second type has a functional relationship with the count of the transmitter and receiver counting circuit.

GB-A- No. 2132453 also describes synchronisation means, in which the receiver counting circuit is incremented by a certain value and then temporarily kept constant. The result is that the receiver is tuned to a frequency which is otherwise not to be used until some time later. If a transmitter starts transmission and the drift of the respective transmitter counting circuit plus the drift of the respective receiver counting circuit ar smaller than the value by which the receiver counting circuit has been incremented, the transmitter will, in course of time, transmit at the fixed frequency used temporarily by the receiver. From this moment onward the receiver counting circuit is no longer kept constant, so that the transmitter and receiver counting circuit are synchronised. This gives rise to the disadvantage that after a prolonged period of radio silence, causing the counting circuit of transmitter and receiver to drift far apart, the receiver counting circuit has to be incremented by a large value. This implies that in the unfavourable case when the receiver counting circuit is ahead of the transmitter counting circuit, a considerable time is needed to synchronise the transmitter and the receiver. If in a still more unfavourable case the receiver counting circuit is not sufficiently incremented, the complete procedure must be repeated with a new larger value to increment the receiver counting circuit, so that it still takes longer to effect synchronisation of a transmitter and receiver.

The above disadvantage is not incurred with the present invention, as the entire synchronisation procedure is carried out with a certain probability within a predetermined time interval, independently of the inaccuracy of the respective counting means. According to the present invention it is possible to keep this probability almost constant.

The latter comes clearly forward in a feasible embodiment of the present invention, whereby for a transmitter said synchronisation means comprises: a transmitter masking unit for masking a group of bits of the associated transmitter counting circuit with a predetermined group of bits, the output signals of which transmitter masking unit, consisting of the masked group of bits and the non-masked group of bits of the transmitter counting circuit, drive the transmitter synthesising circuit; and a transmitter control unit for controlling the transmitter masking unit, whereby for a receiver said synchronisation means comprises: a receiver masking unit for masking a group of bits of the associated receiver counting circuit with a predetermined group of bits, the output signals of which receiver masking unit, consisting of the masked group of bits and the non-masked group of bits of the receiver counting circuit, drive the receiver synthesising circuit; and a receiver control unit for controlling the receiver masking unit, whereby a transmitter control unit starting a message is arranged to command the transmitter masking unit to use during a first and a second time interval a periodic series of predetermined groups of bits for masking the bits of the associated transmitter counting circuit, where each predetermined group of bits contain no bits having a significance lower than a minimum predetermined significance and one bit having the said predetermined significance to give to each group of bits the same number of frequencies forming the predetermined frequency series of the second type and being a subseries of the frequency series of the first type, where the first time interval is of such duration that each period of each subseries is used at least once, where identification words are transmitted at each used frequency, and where said functional relationship arises if certain non-masked bits are more significant than the masked bits, whereby a receiver control unit is arranged to command that, while waiting on a message from a transmitter, first one of the predetermined groups of bits are used for masking the bits of the associated receiver counting circuit, where the predetermined group of bits is so selected that the non-masked transmitter and receiver bits having a greater significance than the masked bits are of the same value, and that second bits of the receiver counting circuit having a lower significance than the predetermined significance are masked with a binary word, such that the receiver is tuned to one of the frequencies used by the transmitter during the first time interval, whereby the receiver control unit is arranged to command that upon the receipt of an identification word from the transmitter the bits of the associated receiver counting circuit are preset with the binary word, and that thereupon the masking of the latter bits is removed, causing the receiver and the transmitter to hop in synchronism over the frequency series of the second type pertaining to the receiver-selected predetermined group of bits, whereby the transmitter control unit is arranged to command that during the second time interval the masked bits of each bit group of the transmitter counting circuit are transmitted in portions spread over the frequencies associated with said bit group, whereby a receiver control unit is arranged to command that the received information of the masked bits belonging to the group of bits selected by the receiver control unit is used for presetting the still-masked bits of the receiver counting circuit, while said information is yet to be corrected for the lapse of time in the second time interval, and whereby the transmitter and receiver control units are arranged to command that at the end of the second time interval the masking of all bits of the transmitter and receiver counting circuit is removed, as said counting means are then in synchronism.

If after a period of radio silence the transmitter and the receiver are in synchronism according to the present invention, the hop synchronisation should be maintained.

The abovementioned and further embodiments of this invention will now be described in more detail with reference to the accompanying drawings, in which.

Figure 1A:
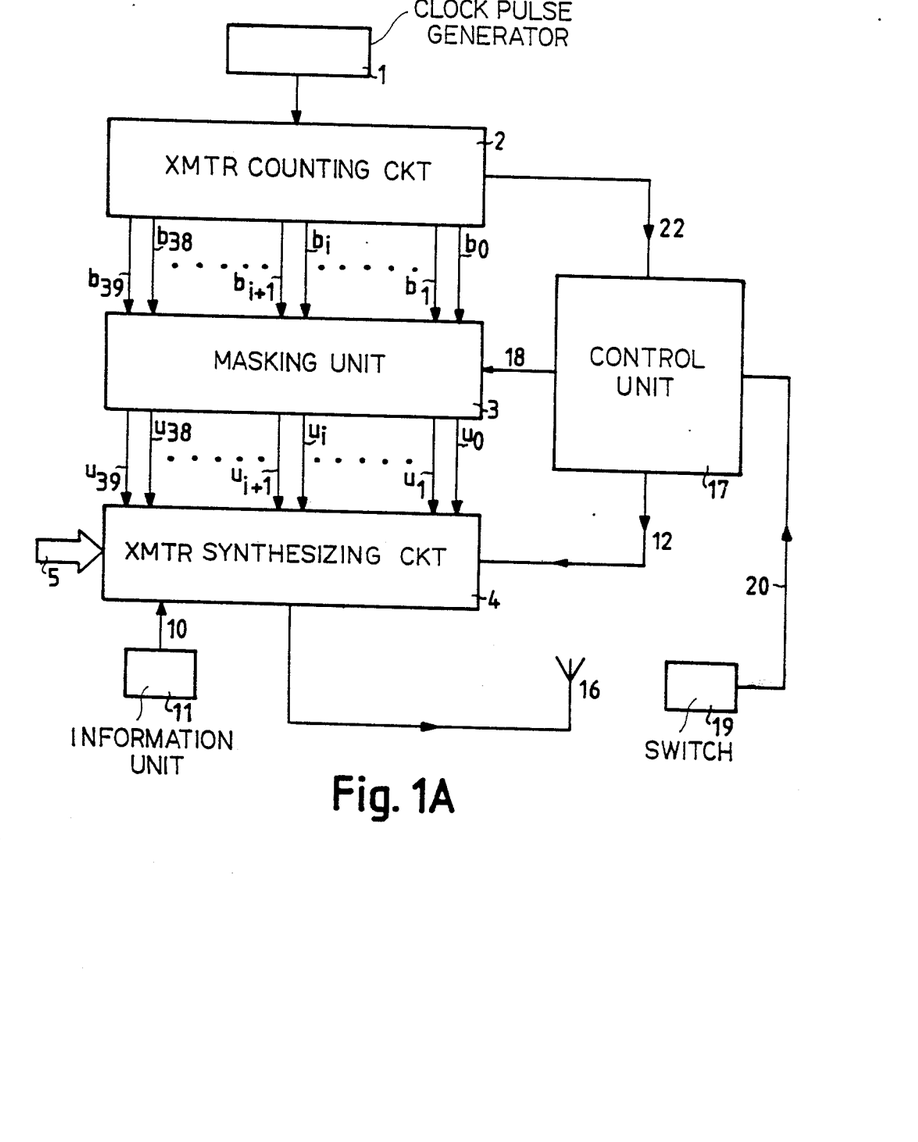
FIG. 1A shows a block diagram of a transmitter according to the invention.

FIG. 1A shows a feasible embodiment of a transmitter of the communication system. In this figure a clock pulse generator 1 has a frequency of 10 kHz. The transmitter counting means here consists of a 40-bit ($b_{39}$, ..., $b_0$) transmitter counting circuit 2 connected to clock pulse generator 1. This means that after 1273 days the counting cycle of the transmitter counting circuit repeats itself. The count consisting of 40 bits ($b_{39}(t)$, ..., $b_0(t)$) of counting circuit 2 is continuously supplied to a masking unit 3. Masking unit 3, having a register capacity for 40 bits ($u_{39}(t)$, ..., $u_0(t)$) as well, is capable of masking a bit $b_i(t)$ with a bit $m_i$, such that $u_i(t) = m_i$. If a bit $b_i(t)$ is not masked, $u_i(t) = b_i(t)$. The set of bits $b_i(t)$ is hereinafter denoted by "group". A group can comprise, for example, the bits ($b_{36}(t)$, $b_{28}(t)$, $b_{27}(t)$, $b_{26}(t)$, $b_{12}(t)$). A group of bits forming a connected series, such as the set ($b_{37}(t)$, $b_{36}(t)$, $b_{35}(t)$, $b_{34}(t)$), is referred to as a "word".

The output signals of masking unit 3 corresponding with bits ($u_{39}(t)$, ..., $u_0(t)$) function as input signals of transmitter synthesising circuit 4. Transmitter synthesising circuit 4 generates for each word ($u_{39}(t)$, ..., $u_0(t)$) a specific frequency in accordance with a certain key 5, which may be exchangeable. For this purpose, transmitter synthesising circuit 4 is provided with a frequency generator 6 (see FIG. 2A). Frequency generator 6 drives a transmitter circuit 7 in frequency via a line 8. Transmitter synthesising circuit 4 is further provided with a summing circuit 9 for summing the signals supplied by an information unit 11 (this may be a microphone or a terminal) via a line 10 and the signals containing the identification words supplied via a line 12. The sum signal obtained is sent to a modulator 14 via a line 13. A carrier wave generator by transmitter 7 drives modulator 14 via a line 15. The output of modulator 14 is connected to an antenna 16.

The transmitter further comprises a control unit 17, which uses a control signal transmitted via line 18 to determine the bits $b_i$ to be masked and the associated value of $m_i$.

Figure 1B:
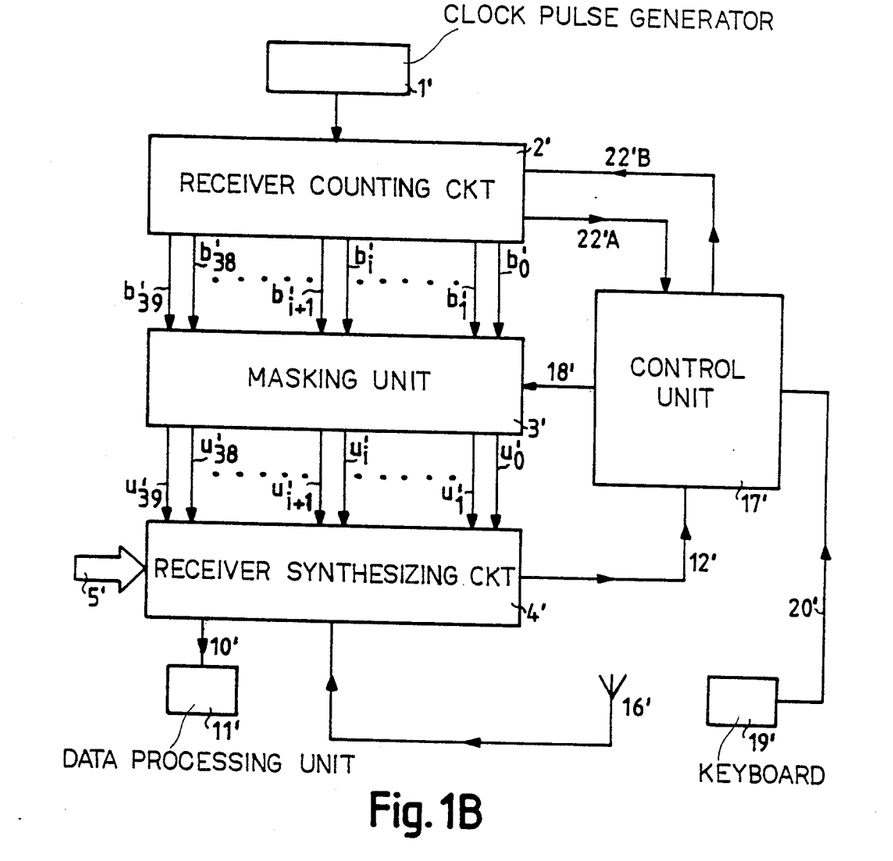
FIG. 1B shows a block diagram of a receiver according to the invention.

FIG. 1B shows a feasible embodiment of a receiver, of which the parts corresponding with those in FIG. 1A are suffixed by a prime ('). Clock pulse generator 1' has also a frequency of 10 kHz, while the receiver synthesising circuit 4' operates in accordance with a key 5' which is identical to key 5. Receiver synthesising circuit 4' is provided with a frequency generator 6' (see FIG. 2B). Frequency generator 6' drives the receiver circuit 7' in frequency via line 8'. Receiver synthesising circuit 4' is further provided with a demodulator 14' for demodulating the information supplied by antenna 16'. The demodulated information is sent to the information divider 9'. Information divider 9' divides the received information into identification words and information generated by the information unit 11. The demodulated identification words are applied via line 12' for further processing. The demodulated information generated by information unit 11 is sent, via a line 10', to a data processing unit 11' (this may be a loudspeaker or a terminal).

Figure 3A:
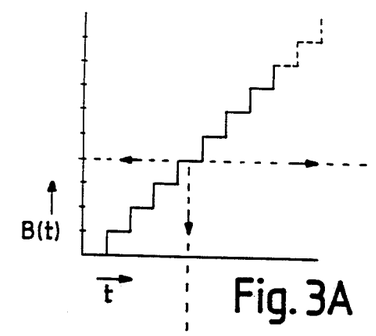
FIG. 3 shows some graphs illustrating how a frequency series is effected.
Figure 3B:
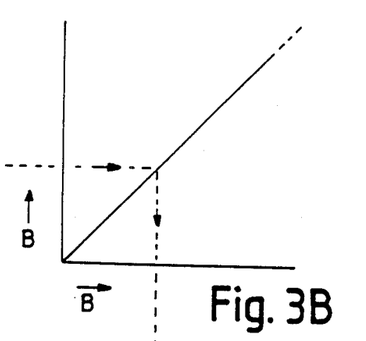
Figure 3C:
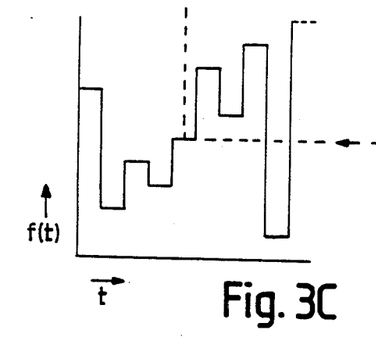
Figure 3D:
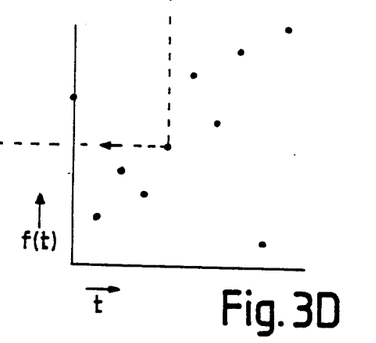

If masking unit 3 is in the conducting state, so that: $u_i(t) = b_i(t)$ ($i = 0, ..., 30$), transmitter synthesising circuit 4 generates each 100 μs a new frequency, as indicated in FIG. 3. At time t transmitter counting circuit 2 represents the time of day $$B(t) = \sum_{i=0}^{39} b_i(t)2^i,$$

as indicated in FIG. 3A. Transmitter syntnesising circuit 4 generates for each value of B(t) a frequency of f(t) unambiguously in accordance with a given key, see FIG. 3D. Considering the time, this gives rise to a frequency series, which is hereinafter designated by "frequency series of the first type". The series is indicated in FIG. 3C, being a combination of FIGS. 3A and 3D, as follows from the use of the auxiliary graph of FIG. 3B. For the receiver an analogous reasoning applies.

Figure 4:
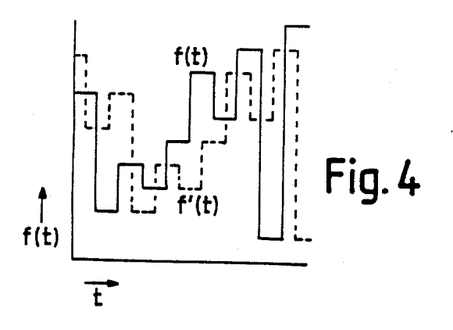
FIG. 4 shows a frequency series of a receiver and of a transmitter which are out of synchronism.

If however transmitter counting circuit 2 and receiver counting circuit 2' are not in synchronism, a situation as indicated in FIG. 4 arises, where f(t) represents the transmitter frequency (continuous line) and f'(t) the receiver frequency (dashed line) as a function of time t. In such a case, communication is not possible. Such a drift between transmitter and receiver may occur if radio silence has taken place for a certain period, causing transmitter and receiver to be out of synchronism during this period. To still enable communication, control unit 17 is arranged to command that the bits $(b_l(t), b_{l-1}(t), \ldots, b_k(t))$, where $0 \leq k \leq l \leq 39$, are masked via line 18, in a predetermined manner during a first time interval with the start of a message. This masking is so selected that the transmitter hops over a periodic frequency series of the second type comprising $2^k$ frequencies. This frequency series is of such duration that it will occur at least once during the first time interval (also if k=0, when the frequency series of the second type is constant, the description below is fulfilled). Because of any non-masked bits $b_i(t)$ (i=39, ..., l+1) the frequency series of the second type may still be a function of these bits. Control unit 17 sends out identification words during the first time interval. In the absence of communication, control unit 17' is arranged to command that the bits $(b'_l(t), b'_{l-1}(t), \ldots, b'_k(t))$ are masked in the predetermined manner. At the same time, control unit 17' is arranged to command that bits $b'_k(t), b'_{k-1}(t), \ldots, b'_0(t)$ are masked with a predetermined word if k >0. The receiver is more or less passively tuned to one of the frequencies to be used by this transmitter during the first time interval. It is here assumed that: $b_{39}(t)=b'_{39}(t), \ldots, b_{l+1}(t)=b'_{l+1}(t)$, as a drift between the clock pulse generators of the transmitter and receiver counting means will manifest itself mostly in the least significant bits. If the receiver receives an identification word transmitted by the transmitter, control unit 17' will preset the bits $(b'_{k-1}, \ldots, b'_0)$ with the predetermined word and remove the masking of these bits. This reception will occur within the time interval of $2^k.10^{-4}$s. From this moment onward the transmitter and the receiver hop in synchronism over a frequency series of the second type. Control unit 17 then commands to transmit, during a second time interval, the value of the masked bits $(b_l(t), b_{l-1}(t), \ldots, b_k(t))$ spread over the frequency series of the second type. Using these received bits $(b_l, b_{l-1}, \ldots, b_k)$, receiver control unit 17' will preset the corresponding bits of the receiver counting means. In such a case, $(b_l(t)=b'_l(t), b_{l-1}(t)=b'_{l-1}(t), \ldots, b_k(t)=b'_k(t))$. Next, control units 17 and 17' will remove the above masking, and the transmitter and the receiver then hop in synchronism over the frequency series of the first type.

With the start of a message the above masking should be of such a nature that the non-masked most significant bits of the transmitter and the receiver are equal in value. The more significant the bit, the smaller the chance that these bits show a mutual deviation due to drift in the clock-pulse generators. The chance of a mutual deviation of bits $b_i$ and $b'_i$ with a time drift of Q seconds is proportional to $(Q/2^i)$. The time drift Q is in general directly proportional to the radio silence such that, according to a feasible embodiment of the present invention, it is advantageous to make the masking (at the receiver) conditional on the duration of the time interval of radio silence. Such a special embodiment will be described in detail below. Also the operation of the control units 17 and 17' will be considered in more detail with reference to FIGS. 5A and 5B, respectively.

With the start of a message the switch 19 of the transmitter will be energised. The microprocessor 21 receives a pulse via line 20 (see FIG. 5A). This pulse will activate microprocessor 21, causing a portion of the bits, viz. $(b_{22}(t), \ldots, b_9(t))$, to be masked with the predetermined word $(m_{22}=1, \ldots, m_9=1)$, via line 18 during a certain time interval. To this effect, microprocessor 21 receives a control signal in the form of $b_0(t)=0$ via line 22. If the control signal is determined by $b_0(t)=1$, control unit 17 causes masking unit 3 to mask another portion of the bits, viz. $(b_{27}(t), \ldots, b_0(t))$, with the predetermined word $(m_{27}=0, \ldots, m_9=0)$ via line 18. The latter two words are stored in memory 23 and are thereto fetched by microprocessor 21 via data and address bus 24, see FIG. 5A.

As a result of the masking with the predetermined word $(m_{22}=1, \ldots, m_9=1)$, transmitter synthesising circuit 4 will generate a frequency series of maximum $(2^9/2)=256$ frequencies repetitively. This frequency series, designated by "first frequency series of the second type", is a subseries of the frequency series of the first type and is changed only every 838.9 seconds, because of a then occurring change in the group of non-masked bits $(b_{39}(t), \ldots, b_{23}(t))$. In this situation the frequency series of the second type still remains a function of the used predetermined word $(m_{22}, \ldots, m_9)$.

The masking with the predetermined word $(m_{27}=0, \ldots, m_9=0)$ is associated with a frequency series which is designated by "second frequency series of the second type" consisting of maximum 256 different frequencies. The second frequency series of the second type is also a subseries of the frequency series of the first type and is changed every 447.4 minutes as a result of a then occurring change in the group of non-masked bits $(b_{39}(t), \ldots, b_{28}(t))$. The second frequency series of the second type is still a function of the used predetermined word $(m_{27}, \ldots, m_9)$.

With the start of a message during the first time interval $T_0=2^9 \times 10^{-4}=5,12 \times 10^{-2}$ seconds, transmitter control unit 17 will transmit identification words on each frequency alternating from the first frequency of the second type and the second frequency series of the second type. To this effect, the identification words are fetched from memory 23 by means of the data and address bus 24 and are applied to modulator 14 via lines 12 and 13, see FIGS. 2A and 5A. For determining the time interval $T_0$ the control unit 17 is provided with a $T_0$ counter 25. This counter is clocked by $b_0(t)$ via line 19. Microprocessor 21 resets $T_0$ counter 25 via line 26 when the microprocessor is activated via line 20. After this time interval of $T_0$ sec, each frequency of the two subseries of the second type is used once.

Depending on the period in which radio silence for the receiver was observed for the last time, control unit 17' of the receiver selects one of the two predetermined words for masking receiver counting circuit 2' via line 18' (see FIG. IA). If a receiver has undergone radio silence for less than 3 days ($\Delta T = 25.92 \times 10^4$ sec), masking with the predetermined word ($m_{22}=1, \ldots, m_9=1$) occurs. If a receiver has undergone radio silence for more than three days, masking with the predetermined word ($m_{27}=0, \ldots, m_9=0$) occurs. Control unit 17' (see FIG. 5B) thereto comprises a microprocessor 21', a memory 32', and a radio-silence counter 27'. On the termination of a message, microprocessor 21' will reset radio-silence counter 27' via line 28'. Radio-silence counter 27' is clocked by $b'_0(t)$ via line 22'A. The count of radio-silence counter 27' is passed to microprocessor 21' via line 29'. Microprocessor 21' selects, as a function of this count, one of the two predetermined words from memory 23' with the aid of data and address bus 24'.

For the purpose of illustration, it is further assumed that the last radio silence was two days. With a clock stability of about $5 \times 10^{-5}$, the clock time $$B(t) = \sum_{i=0}^{39} b_i(t) 2^i$$

has an uncertainty of 8.64 sec after a two-day radio silence. In such a case, microprocessor 21' selects the predetermined word ($m_{22}=1, \ldots, m_9=1$) for masking the receiver counting circuit 2'. If the synchronisation of the receiver occurs on the basis of the frequency series of the second type (for $b_0(t)=0$), the transmitter and the receiver will use the same predetermined word ($m_{22}=0, \ldots, m_9=0$) for bits ($u_{22}(t), \ldots, U_9(t)$) and ($u'_{22}(t), \ldots, u'_9(t)$). Also bits ($u_{39}(t), \ldots, u_{23}(t)$) of the transmitter and ($u'_{39}(t), \ldots, u'_{23}(t)$) of the receiver will be equal to one another with great accuracy, as bits ($u_{23}(t) = b_{23}(t)$ and $u'_{23}(t) = b'_{23}(t)$) are determined in steps of 419.4 sec, while on the basis of the above-mentioned clock stability of the transmitter and the receiver there is a mutual deviation of $2 \times 8.64$ sec between transmitter counting circuit 2 and receiver counting circuit 2' in worst case conditions. Hence, the chance of achieving synchronisation with a first message is practically 100%. To bring the non-masked bits ($b'_8(t), \ldots, b'_0(t)$) of the receiver in synchronous rhythm with bits ($b_8(t), \ldots, b_0(t)$) of the transmitter, microprocessor 21' masks bits ($b'_8(t), \ldots, b'_0(t)$) with a freely selectable word ($m_8, \ldots, m_1, m_0=0$)- via line 18'. In such a case, the receiver is tuned to one of the frequencies to be used by the transmitter with the start of a message within the time interval of $T_0$ sec. Since the transmitter uses the predetermined word ($m_{22}=1, \ldots, m_9=1$) if $b_0=0$, microprocessor 21' has selected ($m_{22}=1, \ldots, m_9=1$) if $b_0=0$, microprocessor 21' has selected $m_0=0$. The receiver is then tuned more or less passively and waits for the moment when it receives an identification word from the transmitter; this means that at this moment the bits ($u_8(t), \ldots, u_0(t)$) at the transmitter and the bits ($u'_8(t), \ldots, u'_0(t)$) at the receiver have the same value. In other words, at this moment the bits ($u_8(t) = b_8(t), \ldots, u_0(t) = b_0(t)$) of the transmitter are equal to the bits ($u'_8(t) = m_8, \ldots, u'_0(t) = m_0$) at the receiver. The identification words which may be used by the transmitter are fetched, via the data and address bus 24', for transmission to correlator 31' via line 30'. The information received by the receiver synthesising circuit 4' is sent to correlator 31' via line 12'. On identifying a sync word from the transmitter, correlator 31' sends a pulse to microprocessor 21' via line 32'. On receiving this pulse, microprocessor 21' will immediately preset bits ($b'_8(t), \ldots, b'_0(t)$) of receiver counting circuit 2' with ($m_8, \ldots, m_0$) via line 2'B and remove the masking of these bits via line 18'. From this moment onward, ($u'_8(t) = b_8(t), \ldots, u'_0(t) = b_0(t)$); however bits ($b'_{22}(t), \ldots, b'_9(t)$) still remain masked. From the moment when microprocessor 21' removes the masking of the preset bits ($b'_9(t), \ldots, b'_0(t)$) the transmitter and the receiver hop in synchronism in the first frequency series of the second type, while the receiver is capable of receiving a message transmitted through this frequency series.

$T_0$ sec after the start of a message and $T_0$ counter 25 will send a sync pulse to microprocessor 21 via line 33, causing microprocessor 21 to reset $T_0$ counter 25 via line 33 and to apply, via lines 22 and 12, the value of the masked bits ($b_{22}(t), \ldots, b_9(t)$) to modulator 14 in the second time interval, between $T_0$ and $2T_0$ sec after the start of a message, in order to transmit this information spread over the 256 frequencies pertaining to the first frequencies series of the second type. On receiving this information via lines 12' and 13' and demodulator 14', microprocessor 21' resets $T_0$ counter 25' via line 26'.

$T_0$ counter 25 and $T_0$ counter 25' switch in synchronism or substantially in synchronism. Microprocessor 21' feeds the received information concerning the value of bits $b_{22}(t), \ldots, b_9(t)$ via lines 1' and 22'B to receiver counting circuit 2' to set this circuit. If necessary, the last-mentioned bits are still corrected if during the second time interval the bit $b'_8(t)$ is clocked from value 1 to value 0. After $T_0$ sec, the end of the second period, $T_0$ counters 25 and 25' will pass a pulse to microprocessor 21 and 21', respectively, via lines 33 and 33'. In response to this, microprocessors 21 and 21' will remove the entire masking via lines 18 and 18', causing from that moment onward the transmitter and the receiver to hop in synchronism over the frequency series of the first type. This enables the unit 11 (e.g. a microphone or a terminal), the modulator 14 and transmitter circuit 7 to transmit messages to the receiver, while hopping occurs over the frequency series of the first type. The total acquisition time is only $2T_0 = 1024 \times 10^{-1}$ sec. The transmitter messages are conveyed by means of receiver circuit 7', modulator 14' and unit 11' (e.g. a loudspeaker or a terminal).

If the last period of radio silence is three or more days, the procedure followed is analogous to that described above, but now with the predetermined word ($m_{27}=0, \ldots, m_9=0$). Also in this case, the acquisition time is independent of the drift of the transmitter and receiver counting circuits. As in this case the bit $b_{28}$ is the most significant non-masked bit, the chance of synchronisation with an acquisition time of $2T_0$ sec is again practically 100%.

Figure 2A:
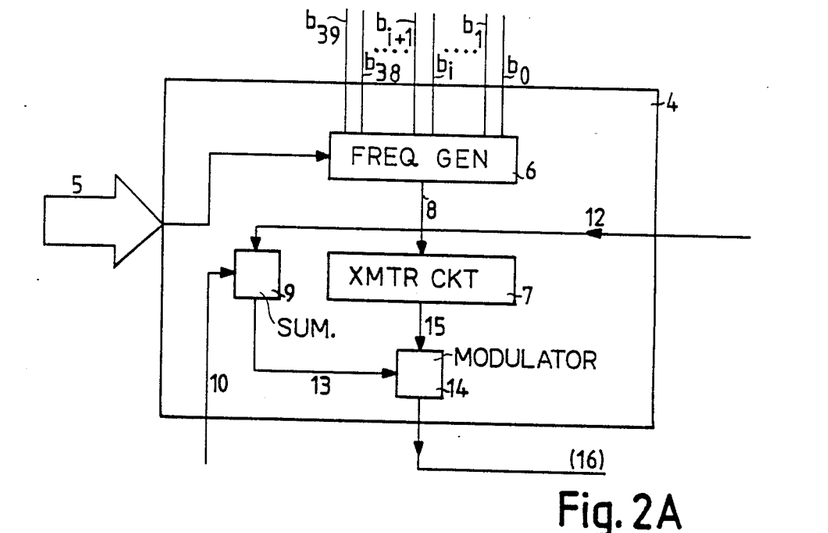
FIG. 2A shows a feasible embodiment of the transmitter synthesising circuit in FIG. 1A.
Figure 2B:
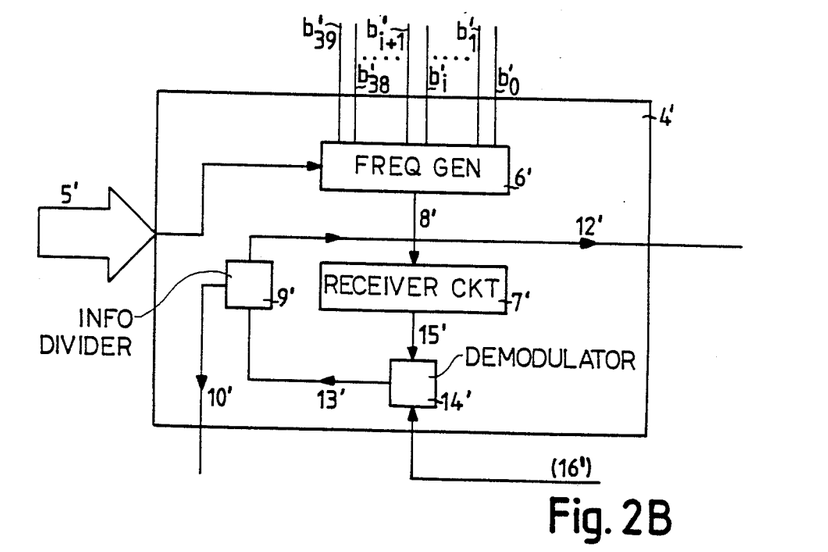
FIG. 2B shows a feasible embodiment of the receiver synthesising circuit in FIG. 1B.
Figure 5A:
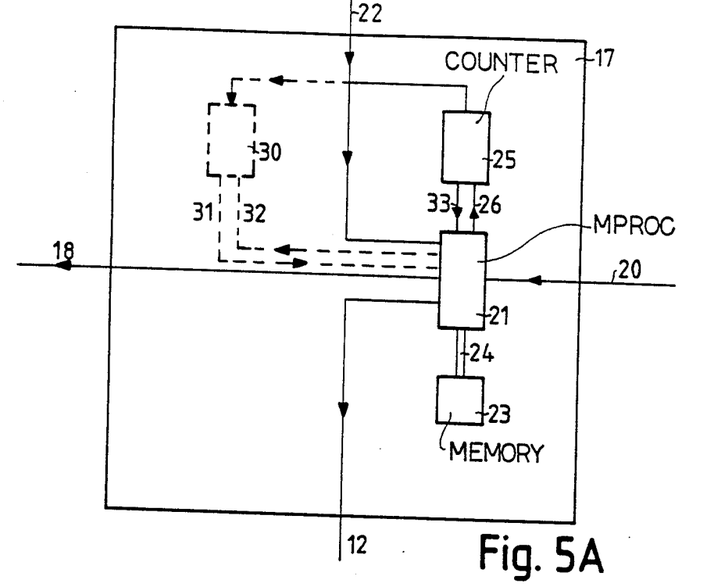
FIG. 5A shows a feasible embodiment of the transmitter control unit in FIG. 1A.
Figure 5B:
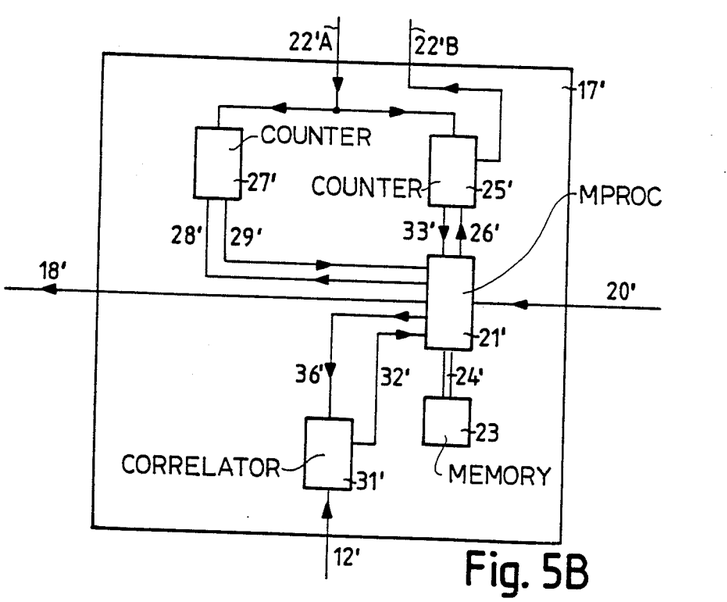
FIG. 5B shows a feasible embodiment of the receiver control unit in FIG. 1B.
Figure 6A:
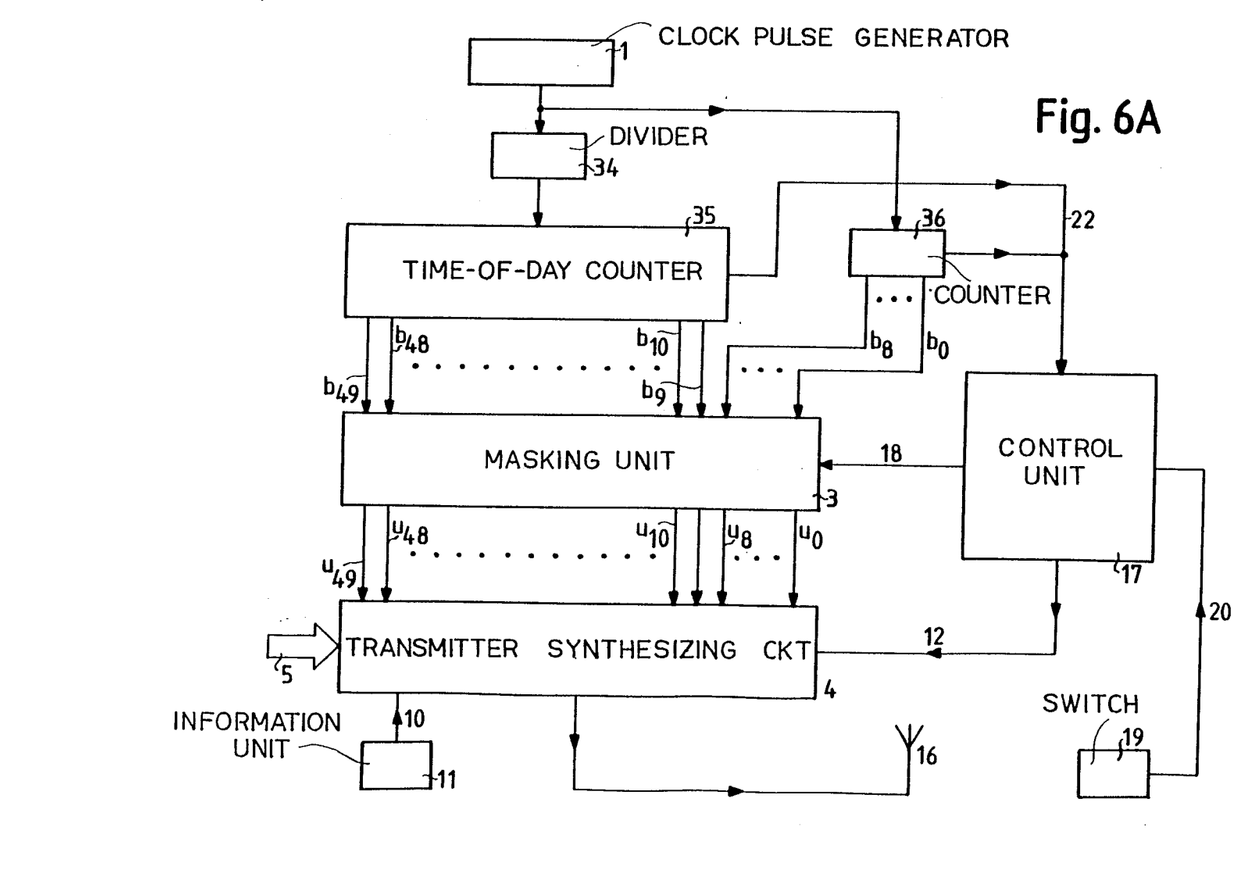
FIG. 6A shows a feasible embodiment of a transmitter according to the invention, which transmitter is prepared for an extra fast acquisition time.
Figure 6B:
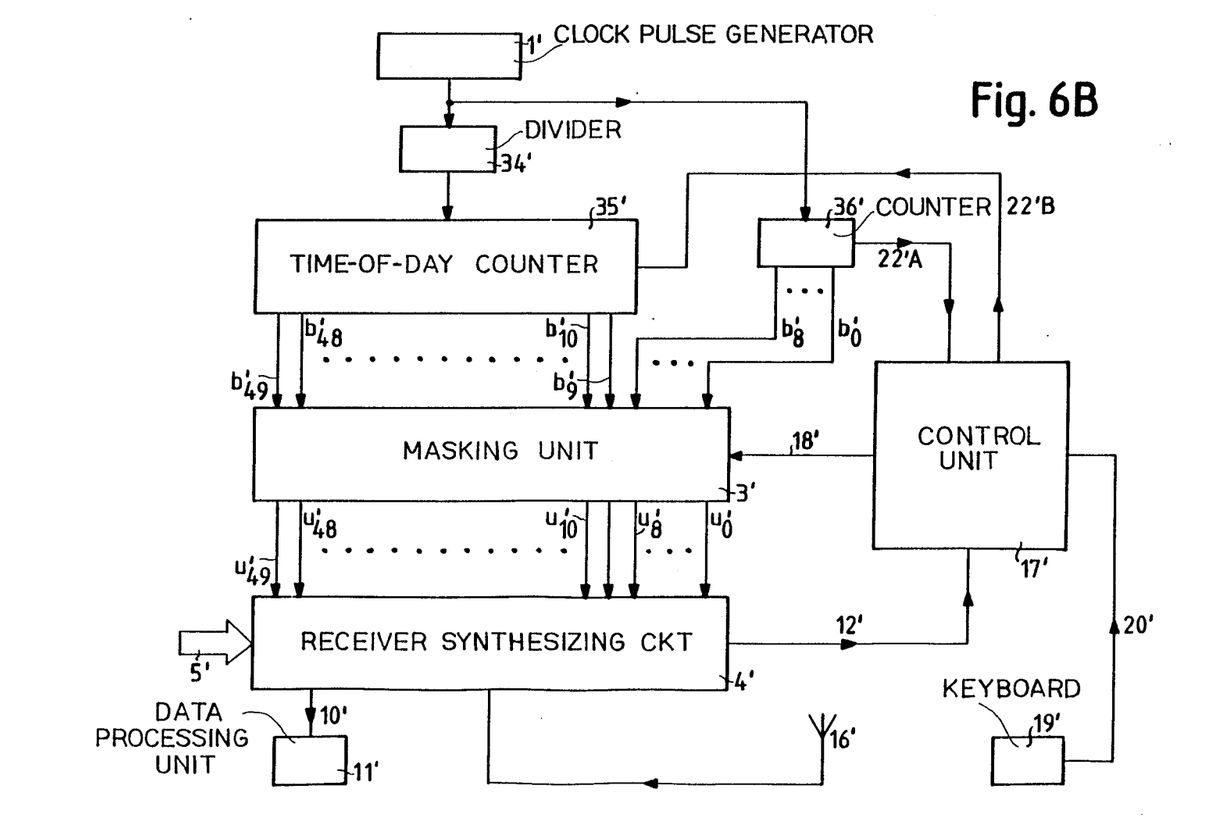
FIG. 6B shows a feasible embodiment of a receiver according to the invention, which receiver is prepared for an extra fast acquisition time.

In case of a radio inserted in the communication system at a later time, it is possible to insert the clock time by hand, e.g. with a watch, by means of a keyboard 19', see FIG. 1B. The absolute accuracy of a watch is, say, 1 minute. In such a case, microprocessor 21' of the receiver will use the predetermined word ($m_{27}=0, \ldots, m_9=0$) to mask receiver counting circuit 2'. Also in this case, the chance of achieving synchronisation with an acquisition time of $2T_0$ sec is practically 100%, as the non-masked bit $b_8$ has an accuracy of 447.4 minutes. If the receiver no longer receives any messages, microprocessor 21' causes the masking unit to mask the counting circuit once again, as described above for a new synchronisation. The end of the message may, for example, be indicated by the transmitter sending an "end of message" word. In such a case, microprocessor 21 causes the end of the message to be masked by an "end of message" word when switch 19 is released. This word is fetched from memory via bus 24 and sent to modulator 14 via lines 12 and 13. With the reception of the end of message word, microprocessor 21' resets radio silence counter 27'. The receiver will then wait for a new message. To enable the receivers to achieve synchronisation also halfway a message, control unit 17 can be provided with an "end of message" counter 30, supplying each P seconds a pulse to microprocessor 21, via line 31. In response, microprocessor 21 fetches the end of message word from memory and transmits this word. At the same time the end of message counter 30 is reset via line 32. The transmitter and the receiver must be re-synchronised to enable receivers activated at a later time to become synchronised every P seconds if the transmission of a message takes longer than P seconds. An embodiment of a transmitter and a receiver with an extra-fast acquisition time is shown in FIGS. 6A and 6B, respectively. In FIG. 6A the transmitter comprises a clock-pulse generator 1 having a frequency of 2.56 MHz. The counting circuit here consists of a $2^8$ divider 34 connected to clock-pulse generator 1, a time-of-day counter 35 connected to $2^8$ divider 34, and an auxiliary counter 36 connected to clock-pulse generator 1. Auxiliary counter 36 supplies the output bits $(b_8(t), \ldots, b_0(t))$ and the time-of-day counter 35 the bits $(b_{49}(t), \ldots, b_9(t))$. The remaining parts 3 to 20 correspond with parts 3 to 20 of FIGS. 1A and 2A. FIG. 6B shows a receiver, where the parts corresponding with FIG. 6A are numbered with a prime. The transmitter and receiver synthesising circuits 4 and 4' are shown in FIGS. 2A and 2B, respectively. Control unit 17 and 17' are shown in FIGS. 5A and 5B, respectively. The control signals of the control units are generated in the same way as in the earlier described embodiment according to the present invention and will therefore need no further explanation.

With the start of a message as a result of the operation of switch 19 or as a result of a pulse from the end of message counter 30, transmitter control unit 17 is arranged to mask, via line 18, bits $(b_{31}(t), \ldots, b_9(t))$ with the predetermined word $(m_{31}=0, m_{30}=1, m_{29}=0, \ldots, m_{11}=0, m_{10}=1, m_9=0)$, if $b_0=0$. This is reported to control unit 17 via line 22. If $b_0=1$, control unit 17 masks, via line 18, the bits $(b_{36}(t), \ldots, b_9(t))$ with the predetermined word $(m_{36}=0, \ldots, m_{15}=0, m_{14}=1, \ldots, m_9=1)$. The first frequency series of the second type pertaining to the second last predetermined word consists of maximum $(2^9/2)=256$ different frequencies and changes each 83 sec as a result of the lowest-order bit of the non-masked bits $(b_{49}(t), \ldots, b_{32}(t))$. The second frequency series of the second type belonging to the last-mentioned predetermined word also consists of maximum 256 different frequencies and changes each 447.4 minutes as a result of the lowest-order bit of the non-masked bits $(b_{49}(t), m \ldots, b_{37}(t))$. Because of the non-masked bits of auxiliary counter 36, a new frequency will be generated each 0.39 μs. With the start of a message during the first time interval of $T_0=2.2^9\times(25.6\times10^5)^{-1}=4\times10^{-4}$ sec, control unit 17 is arranged to transmit identification words at each frequency to be used. After a period of $t=T_0$ sec, each frequency of the two subseries of the second type has been used twice, implying a redundancy. With the aid of radio silence counter 27 receiver control unit 17' selects one of the two predetermined words for masking the time-of-day counter 35'. If a receiver has undergone fewer than three days of radio silence, the predetermined word $(m_{31}=0, m_{30}=1, m_{29}=0, \ldots, m_{11}=0, m_{10}=1, m_9=0)$ is used. In other cases, the predetermined word $(m_{36}=0, \ldots, m_{15}=0, m_{14}=1, \ldots, m_9=1)$ is generated.

For the purpose of illustration it is assumed that the last radio silence is eight days. With a clock-pulse generator stability of about $5\times10^{-5}$, an eight-day radio silence with respect to the time-of-day $$B(t) = \sum_{i=9}^{49} b_i(t) 2^{i-9}$$

entails an uncertainty of 34.56 sec. In such a case, the predetermined word $(m_{36}=0, \ldots, m_{15}=0, m_{14}=1, \ldots, m_9=1)$ is selected for masking the time-of-day counter 35'. Bits $(u_{36}(t), \ldots, u_9(t))$ of the transmitter and the receiver will therefore be equal to one another if the transmitter utilises the frequency series following from the masking associated with $b_0=1$ (i.e. the second frequency series of the second type). There is a great chance that bits $(u_{49}(t), \ldots, u_{37}(t))$ of the transmitter and the receiver are equal to one another, as bit $u_{37}(t)=b_{37}(t)$ is determined in steps of 447.4 minutes, while on the basis of the above-mentioned clock stability in the worst case, the transmitter and the receiver clock times show a mutual deviation of only $2\times34.56$ sec. Control unit 17' commands to mask also bits $(b_8(t), \ldots, b_0(t))$ with a word $(m_8, \ldots, m_1, m_0)$, where $m_0=1$, so that for the output bits $u_0(t)$ to $u_8(t)$: $(u_8(t)=m_8, \ldots, u_1(t)=m_1, u_0(t)=1)$. In such a case, the receiver is set to one of the frequencies to be used by the transmitter with the start of a message within $2T_0$ sec. Here $m_0$ is chosen the be 1, as the receiver must be synchronised if the transmitter uses the predetermined word $(m_{36}=0, \ldots, m_{15}=0, m_{14}=1, \ldots, m_9=1)$ for $b_0=1$. The remaining bits $(m_8, \ldots, m_1)$ are in principle freely selectable, since with the transmitter each combination of $(m_8, \ldots, m_1)$ is used twice during a first time interval of $2T_0$ sec. The last choice may then be pseudo-random, for example. The receiver now waits more or less passively for a transmitted sync word from the transmitter. If at a certain time the receiver receives a message (identification word), control unit 17' causes the bits $(b'_8(t), \ldots, b'_0(t))$ of the auxiliary counter to be preset with bits $(m_8, \ldots, m_0)$ via line 22'B and the masking of bits $(b'_8(t), \ldots, b'_0(t))$ to be removed via line 18', so that at this moment for the output signals of the receiver auxiliary counter: $(u'_8(t)=b_8(t), \ldots, u'_0(t)=b_0(t))$. From this moment onward the transmitter and the receiver operate in synchronism in the second frequency series of the second type.

In the second time interval between $2T_0$ and $3T_0$ sec, after the start of a message, transmitter control unit 17 commands, via lines 22' and 12', to transmit the masked bits $(b_{36}(t), \ldots, b_9(t))$, spread over the 256 frequencies of the second frequency series of the second type. Upon receipt and demodulation of the bits from the ransmitter, the time-of-day counter 35' is preset with the received bits via line 22'B. If necessary, the last-mentioned bits are corrected if during the second time interval the bit $b'_8(t)$ is clocked from value 1 to value 0. At the end of the last time interval, control unit 17 and 17' will remove the masking of the transmitter receiver time-of-day counters 35 and 35' via lines 18 and 18' respectively, and mask the transmitter and receiver auxiliary counters 36 and 36' with the predetermined word ($m_8, \ldots, m_0$). The transmitter and receiver then hop in synchronism over a third frequency series of the second type at a frequency of 10 kHz, which is equal to the frequency at which the non-masked bit $b_9$ changes in value. The total acquisition time is only $3T_0 = 1.2 \times 10^{-3}$ sec. This time is so short just for this reason, as during the acquisition period the hopping took place at an extra-high frequency of 2.56 MHz.

Figure 7:
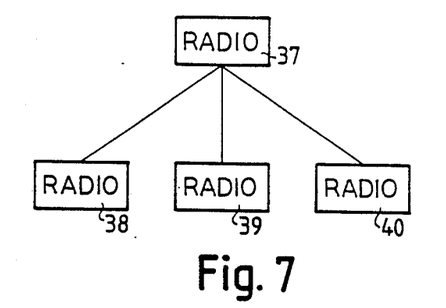
FIG. 7 shows a feasible set-up of a network in a communication system.
Figure 8:
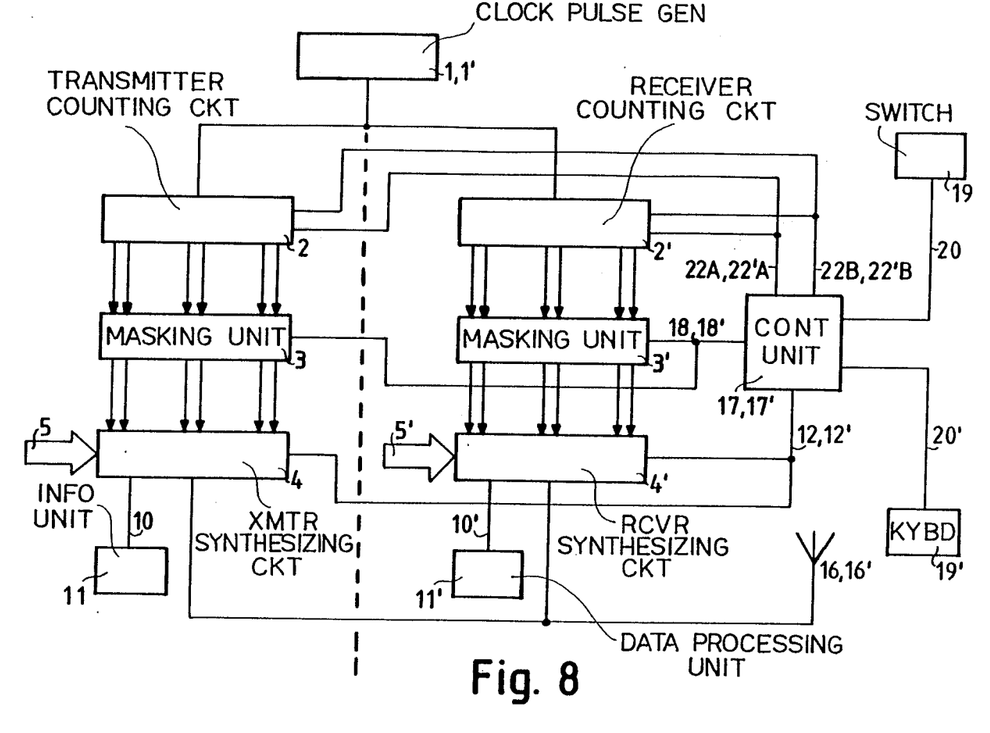
FIG. 8 shows a feasible embodiment of a master and/or slave radio.

FIG. 7 shows a feasible embodiment of a communication system. By way of example this communication system consists of a network containing four radios 37 to 40, each of which comprising a transmitter and a receiver. Such a communication system involves the requirement that the counting circuits of the various radios mutually do not drift away to excess. This may be realised by designating one radio as the master. All other radios, so-called slave radios, may then exclusively take over and hold count information of the counting circuit of a master radio. A master radio may take over count information of a slave radio only temporarily and only if it concerns the receipt of a message to be transmitted by this slave radio. On the termination of such a message the master has to return to the original count of its counting circuit. This may be realised as follows:

Each radio consists of a transmitter and a receiver corresponding with the type of FIGS. 1A and 1B, respectively. To enable synchronisation of a transmitter and receiver counting circuit of a radio, this circuit is driven by a common clock-pulse generator, see also FIG. 8. In FIG. 8 the transmitter and the receiver are provided with a common control unit 17, 17'. The structure of control unit 17, 17' is comparable with that of the control unit in FIGS. 5A and 5B, respectively. A master radio, as in the example in question, may be of the same type as a slave radio. Through a keyboard 19' and line 20', which line is controlled by microprocessor 21, 21', the radio can be programmed as a master or a slave. With the start of a message a master radio will also transmit an identification word to indicate that it concerns a message from a master radio. By means of correlator 31' a slave radio is capable of labelling a received message as being a message transmitted by a master radio. The communication between different radios can be controlled by the associated microprocessors as follows: If master radio 37 receives a message from a transmitter of one of the slave radios, the receiver counting circuit of master radio 37 will have taken over the current count of the transmitter counting circuit of this slave radio temporarily after the acquisition time to enable communication between the two radios. If however the message has ended, the receiver counting circuit of the master radio will again be operable in accordance with its original time function. This is realised by taking over the count of the master transmitter counting circuit. Therefore, the two counting circuits of a master radio contain the same information, unless a message is temporarily received from a slave transmitter. In such a case, the receiver counting circuit of the master radio takes over the contents of the transmitter counting circuit of the slave radio temporarily.

If a slave radio receives a message from a master radio, the count of the receiver counting circuit of the slave radio will, after the acquisition time, be equal to that of the transmitter counting circuit of the master radio. On the other hand the receiver counting circuit of the slave radio will not return to its own time function after the end of the message. In this case the transmitter counting circuit of the slave radio will take over the count of the last-mentioned receiver counting circuit, so that the slave radio is fully synchronised with the master radio. For the presetting of the transmitter counting circuit 2 the transmitter also comprises a line 22B corresponding with 22'B. Line 22A corresponds with line 22 of FIG. 1A. If a slave radio receives a message from a slave radio, the former will behave as a master radio. Hence, the counting circuits of the slave radio receiving the message will not take over and hold the count of the counting circuits of the other slave radio.

Figure 9:
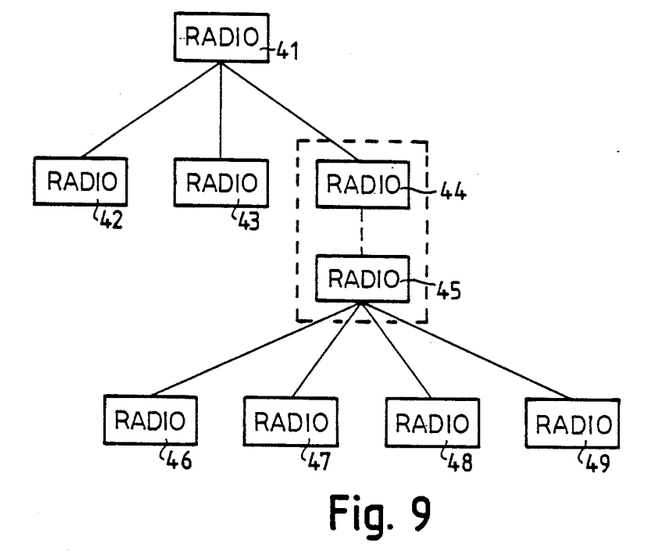
FIG. 9 shows a communication system, in which two networks are coupled.

FIG. 9 shows how two networks can be coupled. By way of example, the first network is provided with one master radio 41 and three slave radios 42, 43 and 44. The second network on the other hand is provided with a master radio 45 and four slave radios 46, 47, 48 and 49. The master and slave radios within one network operate as described hereinbefore: The coupling of the two networks is effected by coupling slave radio 4 of the first network to master radio 45 of the second network. The coupling may be realised for example with little transmitter power at a fixed or hopping frequency. It is also possible to directly interconnect the counting circuits of slave radio 44 and master radio 45 via a wire connection if the two radios are located near to each other. In such a case, the communication system is so arranged that the master radio of the second network regularly takes over the count of the counting circuit of the associated slave radio of the first network but only during the receive mode. A control unit can thereto be provided with a counter, which is of the same type as the end of message counter 27. A slave radio of the second network may in turn be coupled to a master radio of the third network in the same way. In this way the count of the master radio counting circuits of the first network will regularly be taken over by all other radios.

We claim:

1. Communication system, comprising: at least one transmitter provided with a clock-pulse generator, a transmitter counting circuit connected to the clock-pulse generator for producing timing signals, a transmitter synthesising circuit driven by said timing signals for time-dependently selecting a carrier frequency from a predetermined periodic frequency series of the first type and for generating and modulating said carrier frequency; the communication system further comprising at least one receiver provided with a of clock-pulse generator, a receiver counting circuit connected to said clock-pulse generator for generating timing signals, a receiver synthesising circuit driven by said timing signals for time-dependently selecting the carrier frequency from the predetermined periodic frequency series of the first type also available in the receiver and for demodulating said carrier frequency; the communication system still further comprising synchronisation means for synchronising the receiver synthesising circuit with the transmitter synthesising circuit by means of a message of the transmitter containing the count information of the transmitter counting circuit at the time of commencement, characterised in that the synchronisation means is arranged to successively transmit count information spread over different frequencies, where each frequency, being retained for a certain time interval, is an element of a predetermined frequency series of the second type, which frequency series is an element of a predetermined set of frequency series, where the selection of the frequency series of the second type has a functional relationship with the count of the transmitter and receiver counting circuits.

2. Communication system as claimed in claim 1, characterised in that the frequency series of the second type consists of one or several subseries of the frequency series of the first type.

3. Communication system as claimed in claim 2, characterised in that for a transmitter said synchronisation means comprises: a transmitter masking unit for masking a group of bits of the associated transmitter counting circuit with a predetermined group of bits, the output signals of which transmitter masking unit, consisting of the masked group of bits and the non-masked group of bits of the transmitter counting circuit, drive the transmitter synthesising circuit; and a transmitter control unit for controlling the transmitter masking unit, whereby for a receiver said synchronisation means comprises: a receiver masking unit for masking a group of bits of the associated receiver counting circuit with a predetermined group of bits, the output signals of which receiver masking unit, consisting of the masked group of bits and the non-masked group of bits of the receiver counting circuit, drive the receiver synthesising circuit; and a receiver control unit for controlling the receiver masking unit, whereby a transmitter control unit starting a message is arranged to command the transmitter masking unit to use during a first and a second time interval a periodic series of predetermined groups of bits for masking the bits of the associated transmitter counting circuit, where each predetermined group of bits contain no bits having a significance lower than a minimum predetermined significance and one bit having the said predetermined significance to give to each group of bits the same number of frequencies forming the predetermined frequency series of the second type and being a subseries of the frequency series of the first type, where the first time interval is of such duration that each period of each subseries is used at least once, where identification words are transmitted at each used frequency, and where said functional relationship arises if certain non-masked bits are more significant than the masked bits, whereby a receiver control unit is arranged to command that, while waiting on a message from a transmitter, first one of the predetermined groups of bits are used for masking the bits of the associated receiver counting circuit, where the predetermined group of bits is so selected that the non-masked transmitter and receiver bits having a greater significance than the masked bits are of the same value, and that second the bits of the receiver counting circuit having a lower significance than the predetermined significance are masked with a binary word, such that the receiver is tuned to one of the frequencies used by the transmitter during the first time interval, whereby the receiver control unit is arranged to command that upon the receipt of an identification word from the transmitter the bits of the associated receiver counting circuit are preset with the binary word, and that thereupon the masking of the latter bits is removed, causing the receiver and the transmitter to hop in synchronism over the frequency series of the second type pertaining to the receiver-selected predetermined group of bits, whereby the transmitter control unit is arranged to command that during the second time interval the masked bits of each bit group of the transmitter counting circuit are transmitted in portions spread over the frequencies associated with said bit group, whereby a receiver control unit is arranged to command that the received information of the masked bits belonging to the group of bits selected by the receiver control unit is used for presetting the still-masked bits of the receiver counting circuit, while said information is yet to be corrected for the lapse of time in the second time interval, and whereby the transmitter and receiver control units are arranged to command that at the end of the second time interval the masking of all bits of the transmitter and receiver counting circuit is removed, as said counting means are then in synchronism.

4. Communication system as claimed in claim 2, characterised in that for a transmitter said synchronisation means comprises: a transmitter masking unit for masking a group of bits of the associated transmitter counting circuit with a predetermined group of bits, the output signals of which transmitter masking unit, consisting of the masked group of bits and the non-masked group of bits of the transmitter counting circuit, drive the transmitter synthesising circuit; and a transmitter control unit for controlling the transmitter masking unit, whereby for a receiver said synchronisation means comprises: a receiver masking unit for masking a group of bits of the associated receiver counting circuit with a predetermined group of bits, the output signals of which receiver masking unit, consisting of the masked group of bits and the non-masked group of bits of the receiver counting circuit, drive the receiver synthesising circuit; and a receiver control unit for controlling the receiver masking unit, whereby a transmitter control unit starting a message is arranged to command the transmitter masking unit to use during a first and a second time interval a periodic series of predetermined groups of bits for masking the bits of the associated transmitter counting circuit, where each predetermined group of bits contain no bits having a significance lower than a minimum predetermined significance and one bit having the said predetermined significance to give to each group of bits the same number of frequencies forming the predetermined frequency series of the second type and being a subseries of the frequency series of the first type, where the first time interval is of such duration that each period of each subseries is used at least once, where identification words are transmitted at each used frequency, and where said functional relationship arises if certain non-masked bits are more significant than the masked bits, whereby a receiver control unit is arranged to command that, while waiting on a message from a transmitter, first one of the predetermined groups of bits are used for masking the bits of the associated receiver counting circuit, where the predetermined group of bits is so selected that the non-masked transmitter and receiver bits having a greater significance than the masked bits are of the same value, and that second the bits of the receiver counting circuit having a lower significance than the predetermined significance are masked with a binary word, such that the receiver is tuned to one of the frequencies used by the transmitter during the first time interval, whereby the receiver control unit is arranged to command that upon the receipt of an identification word from the transmitter the bits of the associated receiver counting circuit are preset with the binary word, and that thereupon the masking of the latter bits is removed, causing the receiver and the transmitter to hop in synchronism over the frequency series of the second type pertaining to the receiver-selected predetermined group of bits, whereby the transmitter control unit is arranged to command that during the second time interval the masked bits of each bit group of the transmitter counting circuit are transmitted in portions spread over the frequencies associated with said bit group, whereby a receiver control unit is arranged to command that the received information of the masked bits belonging to the group of bits selected by the receiver control unit is used for presetting the still-masked bits of the receiver counting circuit, while said information is yet to be corrected for the lapse of time in the second time interval, and whereby the transmitter and receiver control units are arranged to command that at the end of the second time interval the bits of said counting means are masked with a predetermined group of bits in like manner.

5. Communication system as claimed in claim 3 or 4, characterised in that said selection is a function of the length of the time interval of the last radio silence of the receiver, such that the significance of the most significant bit of the bit group to be selected increases if said time interval becomes greater.

6. Communication system as claimed in claim 3, 4 or 5, characterised in that said selection is also dependent upon the possible fact that a receiver is added to the communication system, whereby the respective receiver counting circuit is preset by means of an external time indicator.

7. Communication system as claimed in claim 6, characterized in that a transmitter masking unit and a receiver masking unit are of the same type.

8. Communication system as claimed in claim 6, characterized in that a transmitter masking unit and a receiver masking unit are of the same type, and that the transmitter counting circuit and the receiver counting circuit are of the same type.

9. Communication system as claimed in claim 3, 4, or 5, characterised in that a transmitter masking unit and a receiver masking unit are of the same type.

10. Communication system as claimed in claim 3, 4, or 5, characterised in that the transmitter counting circuit and the receiver counting circuit are of the same type.

11. Communication system as claimed in claims 4, 5, 7 or 8, characterised in that each of the transmitter and receiver counting circuits comprises a $2^k$-divider, the input of which divider being fed with the output signal of a clock-pulse generator at a clock frequency of $f_o \cdot 2^k = (1/T_0) \cdot 2^k$ and the output of which divider being connected to a time-of-day counter forming part of the respective counting circuits, whereby the time-of-day counter produces a binary output signal ($b_n, b_{n-1}, \ldots, b_{k+1}$) representing the time of the day, whereby said counting circuits further comprise an auxiliary counter receiving the output signal of the clock-pulse generator to produce a binary output signal ($b_k, b_{k-1}, \ldots, b_0$), whereby the combined signal ($b_n, \ldots, b_0$) is connected to the masking unit to produce an output signal ($u_n, \ldots, u_0$) used as input signal for the transmitter and receiver synthesising circuits to generate with each binary word ($u_n, \ldots, u_0$) an associated frequency, whereby with the start of a message during the first time interval of $t = T_0$ sec the transmitter control unit is arranged to command that at the transmitter masking unit output signals ($u_n = b_n, \ldots, u_l = b_l, u_{l-1} = m_{l-1}, \ldots, u_k = m_k, u_{k-1} = b_{k-1}, \ldots, u_1 = b_1, u_0 = b_0 = 0$) and ($u_n = b_n, \ldots, u_{l+i} = b_{l+i}, u_{l+i-1} = m'_{l+i-1}, \ldots, u_k = m'_k, u_{k-1} = b_{k-1}, \ldots, u_l = b_1, u_0 = b_0 = 1$) are generated alternately, such that during the first time interval $2^k$ different frequencies are generated, in which output signals $m_k, \ldots, m_{l-1}$ and $m'_k, \ldots, m'_{l+i-1}$, k, l and i are predetermined constants and $m_k, \ldots, m_{l-1}$ and $m'_k, \ldots, m'_{l+i-1}$ each form a group, whereby a receiver control unit is arranged to command that at the receiver masking unit an output signal ($u_n = b_n, \ldots, u_l = b_l, u_{l-1} = m_{l-1}, \ldots, u_k = m_k, u_{k-1} = m_{k-1}, \ldots, u_1 = m_1, u_0 = m_0 = 0$), where $m_1, \ldots, m_{l-1}$ are random constants, is generated if the time interval of the last radio silence is smaller than $R_o$ sec, and an output signal ($u_n = b_n, \ldots, u_{l+i} = b_{l+i}, u_{l+i-1} = m'_{l+i-1}, \ldots, u_k = m'_k, u_{k-1} = m'_{k-1}, \ldots, u_1 = m'_1, u_0 = m'_0 = 1$), where $m'_l, \ldots, m'_{k-1}$ are random constants, if the time interval is greater than or equal to $R_o$ sec, whereby during the second time interval of $t = T_0$ sec the transmitter control unit is arranged to command that first the bits ($b_{l-1}, \ldots, b_k$) spread over the first frequency series of the second type associated with the first masking unit output signal ($u_n = b_n, \ldots, u_l, u_{l-1} = m_{l-1}, \ldots, u_k = m_k, u_{k-1} = b_{k-1}, \ldots, u_1 = b_1, u_0 = b_0 = 0$) are transmitted, and second the bits ($b_{l+i-1}, \ldots, b_k$) spread over the second frequency series of the second type associated with the second masking unit output signal ($u_n = b_n, \ldots, u_{l+i} = b_{l+i}, u_{l+i-1} = m'_{l+i-1}, \ldots, u_k = m'_k, u_{k-1} = b_{k-1}, \ldots, u_1 = b_1, u_0 = b_0 = 1$), whereby a receiver receives the said bits ($b_{l-1}, \ldots, b_k$) to preset the corresponding bits of the receiver time-of-day counter if the time interval of the last radio silence is smaller than $R_o$ sec and receives the said bits ($b_{l+i-1}, \ldots, b_k$) to preset the corresponding bits of the receiver time-of-day counter if the time interval of the last radio silence is greater than or equal to $R_o$ sec, and whereby the transmitter and receiver control units are arranged to command that $2T_0$ sec after the start of the message the output signals are masked in such a way that ($u_n = b_n, \ldots, u_k = b_k, u_{k-1} = m'''_{k-1}, \ldots, u_1 = m'''_1, u_0 = m'''_0$), where $m'''_{k-1}, \ldots, m'''_0$ are predetermined constants, causing the transmitter and the receiver to hop in synchronism over a third predetermined frequency series of the second type at a hopping frequency equal to $f_o$.

12. Communication system as claimed in claims 3, 5, 7 or 8, characterised in that a transmitter and receiver counting system includes a time-of-day counter receiving the output signal of a clock-pulse generator, at a clock frequency of $f_o=(1/T_0)$ producing a binary output signal ($b_n, \ldots, b_0$) functioning as input signal for a masking unit to produce an output signal ($u_n, \ldots, u_0$) functioning as input signal for the transmitter and receiver synthesising circuit to generate with each binary word ($u_n, \ldots, u_0$) an associated frequency, whereby with the start of a message during the first time interval of $t=T_0 2^k$ sec the transmitter control unit is arranged to command that at the transmitter masking unit output signals ($u_n=b_n, \ldots, u_l=b_l, u_{l-1}=m_{l-1}, \ldots, u_k=m_k, u_{k-1}=b_{k-1}, \ldots, u_l=b_l, u_0=b_0=1$) and ($u_n=b_n, \ldots, u_{l+i}=b_{l+i}, u_{l+i-1}=m'_{l+i-1}, \ldots, u_k=m'_k, u_{k-1}=b_{k-1}, \ldots, u_1=b_1, u_0=b_0=0$) are generated alternately, such that during the first time interval $2^k$ different frequencies are generated, in which output signals $m_k, \ldots, m_{l-1}$ and $m'_k, \ldots, m'_{l+i-1}$, k, l and i are predetermined constants and $m_k, \ldots, m_{l-1}$ and $m'_k, \ldots, m'_{l+i-1}$ each form a group, whereby a receiver control unit is arranged to command that at the receiver masking unit an output signal ($u_n=b_n, \ldots, u_l=b_l, u_{l-1}=m_{l-1}, \ldots, u_k=m_k, u_{k-1}=m_{k-1}, \ldots, u_1=m_1, u_0=m_0=1$), where $m_1, \ldots, m_{k-1}$ are random constants, is generated if the time interval of the last radio silence is smaller than $R_o$ sec, and an output signal ($u_n=b_n, \ldots, u_{l+i}=b_{l+i}, u_{l+i-1}=m'_{l+i-1}, \ldots, u_k=m'_k, u_{k-1}=m'_{k-1}, \ldots, u'_1=m'_1, u_0=m'_0=0$), where $m'_1, \ldots, m'_{k-1}$ are random constants, if the time interval is greater than or equal to $R_o$ sec, whereby during the second time interval of $t=T_0 2^k$ sec the transmitter control unit is arranged to command that first the bits ($b_{l-l}, \ldots, b_k$) spread over the first frequency series of the second type associated with the masking unit output signal ($u_n=b_n, \ldots, u_l=b_l, u_{l-1}=m_{l-1}, \ldots, u_k=m_k, u_{k-1}=b_{k-1}, \ldots, u_1=b_1, u_0=b_0=1$) are transmitted, and second the bits ($b_{1+i-1}, \ldots, b_k$) spread over the second frequency series of the second type associated with the second masking unit output signal ($u_n=b_n, \ldots, u_{l+i}=b_{l+i}, u_{l+i-1}=m'_{l+i-1}, \ldots, u_k=m'_k, u_{k-1}=b_{k-1}, \ldots, u_1=b_1, u_0=b_0=0$), whereby a receiver receives the said bits ($bl_{l-1}, \ldots, b_k$) to preset the corresponding bits of the receiver time-of-day counter if the time interval of the last radio silence is smaller than $R_o$ sec and receives the said bits ($b_{l+i-1}, \ldots, b_k$) to preset the corresponding bits of the receiver time-of-day counter if the time interval of the last radio silence is greater than or equal to $R_o$ sec, and whereby the transmitter and receiver control units are arranged to command that $T_0 2^{k+1}$ sec after the start of the message the masking of the output signals is removed, such that ($u_n=b_n, \ldots, u_0=b_0$) and the transmitter and the receiver hop in synchronism over a predetermined frequency series of the first type at a hopping frequency equal to $f_o$.

13. Communication system as claimed in claims 3, 5, 7 or 8, characterised in that a transmitter and receiver counting system includes a time-of-day counter receiving the output signal of a clock-pulse generator at a clock frequency of $f_o=(1/T_0)$ and producing a binary output signal ($b_n, \ldots, b_0$) functioning as input signal for a masking unit to produce an output signal ($u_n, \ldots, u_0$) functioning as input signal for the transmitter and receiver control means to generate with each binary word ($u_n, \ldots, u_0$) an associated frequency, whereby with the start of a message during the first time interval of $t=T_0 2^k$ sec the transmitter control unit is arranged to command that at the transmitter masking unit an output signal ($u_n=m_n, \ldots, u_k=m_k, u_{k-1}=b_{k-1}, \ldots, u_0=b_0$ is generated, such that during the first time interval $2^k$ different frequencies are generated, in which output signal $m_k, \ldots, m_n$, and k are predetermined constants and $m_k, \ldots, m_n$ form a group, whereby a receiver control unit is arranged to command that at the receiver masking unit an output signal ($u_n=m_n, \ldots, u_k=m_k, u_{k-1}=m_{k-1}, \ldots, u_0=m_0$), where $m_0, \ldots, m_{k-1}$ are random constants, is generated, whereby during the second time interval of $t=T_0 2^k$ sec the transmitter control unit is arranged to transmit the bits ($b_n, \ldots, b_k$) spread over the frequency series of the second type associated with the masking unit output signal ($u_n=m_n, \ldots, u_k=m_k, u_{k-1}=b_{k-1}, \ldots, u_0=b_0$, whereby a receiver receives the said bits ($b_n, \ldots, b_k$) to preset the corresponding bits of the time-of-day counter, and whereby the transmitter and receiver control units are arranged to command that after the start of the message the masking of the output signals is removed such that ($u_n=b_n, \ldots, u_0=b_0$), and the transmitter and the receiver hop in synchronism over a predetermined frequency series of the first type at a hopping frequency equal to $f_o$.

14. Communication system as claimed in claim 1 characterised in that the communication system includes one or a plurality of networks, whereby a network includes one master radio and one or a plurality of slave radios, whereby a master radio includes a master transmitter and an associated master receiver, whereby after a message from a slave radio, the master-receiver control unit presets the count of the master-receiver counting circuit with the count of the master-transmitter counting circuit, whereby a slave radio includes a slave transmitter and an associated slave receiver, whereby after a message from a master radio the slave-transmitter control unit presets the count of the slave-transmitter counting circuit with the count of the slave-receiver counting circuit, and whereby after a message from another slave radio the slave-receiver control unit presets the count of the slave-receiver counting circuit with the count of the associated slave-transmitter counting circuit.

15. Receiver operable for use as described in claim 1.

16. Transmitter operable for use as described in claim 1.

17. Radio operable for use as described in claim 14.

* * * * *